United States Patent [19]

Schuette et al.

[11] Patent Number: 5,716,702
[45] Date of Patent: Feb. 10, 1998

[54] PREWEIGHED PREDISPERSIONS PACKAGED IN MASTERBATCH

[75] Inventors: Walter H. Schuette, Newtown; Anders H. Johansson, Yardley, both of Pa.

[73] Assignee: Rhein Chemie Corporation, Trenton, N.J.

[21] Appl. No.: 533,483

[22] Filed: Sep. 25, 1995

[51] Int. Cl.$^6$ .................. B65D 25/08; C08F 36/00
[52] U.S. Cl. .................. 428/36.8; 523/351; 524/571; 206/524.1; 206/524.7; 264/349; 425/472
[58] Field of Search .................. 523/351; 524/571; 428/36.8; 206/524.1, 524.7; 264/349; 425/472

[56] References Cited

U.S. PATENT DOCUMENTS

| | | | |
|---|---|---|---|
| 4,394,473 | 7/1983 | Winter et al. | 524/226 |
| 4,833,226 | 5/1989 | Ishimura et al. | 523/206 |
| 5,120,787 | 6/1992 | Drasner | 524/524 |
| 5,430,077 | 7/1995 | Unger | 523/351 |

FOREIGN PATENT DOCUMENTS

| | | |
|---|---|---|
| 1199825 | 7/1970 | United Kingdom . |
| 95/07314 | 3/1995 | WIPO . |

*Primary Examiner*—Andrew E.C. Merriam
*Attorney, Agent, or Firm*—Joseph C. Gil; Godfried R. Akorli; Noland J. Cheung

[57] ABSTRACT

Disclosed herein is a packaging system comprising predispersed chemicals in preweighed quantities embedded in multiple separated compartments of a masterbatch.

7 Claims, No Drawings

PREWEIGHED PREDISPERSIONS PACKAGED IN MASTERBATCH

BACKGROUND OF THE INVENTION

1. Field of the Invention

The present invention relates to a packaging system comprising predispersed chemicals enveloped in a masterbatch and methods of making and using the same. More specifically the present invention relates to a packaging system for predispersed rubber chemicals.

2. Brief Description of the Prior Art

While the related prior art describes preweighed powder chemicals, the use of the preweighed powder chemicals is plagued with problems inherent to powders. For example, the use of powders presents housekeeping problems resulting from the difficulty of cleaning spilled powders. When added to blenders such as Banbury or mills, varying amounts of the powders have a tendency to be removed by the dust collecting system. The loss of variable amounts of the powders can adversely affect the amounts and ratios in which the powders are used and also affect batch-to-batch consistency of products that are made therewith. Powders have the tendency to mix unevenly. They have the tendency to find dead spots in mixers and thus avoid mixing consistently on a batch-to-batch basis. Some powders have the tendency to agglomerate during storage or form plates during mixing. Both phenomena lead to poor dispersions that ultimately translate into products such as vulcanizates with varying or unacceptable properties. No matter how carefully handled, powders have the tendency to get on the hands and clothes of workers handling them and thereby create health hazards. Powders have the tendency to stick to bags, thus changing the amounts added each time and making disposal of the bags environmentally challenging.

Rubber compounding bags and films are also disclosed by the prior art. U.S. Pat. No. 4,394,473 discloses bales of unvulcanized rubber, vulcanized rubber or compounding ingredients for unvulcanized rubber packaged in films or bags made from sydiotactic 1,2-polybutadiene containing at least one anti-blocking agent and at least one slip agent additive. Co-extrusions can be used to manufacture bags or films having two or more layers where only the inside layer is heavily loaded with an anti-block agent. The outside layer contains only a minimal amount of anti-block agent with both layers containing slip agents. The disadvantage of such films and the preweighed packages made from them is the relatively high mixing temperatures required to soften the wrapping materials sufficiently in order to obtain homogeneous incorporation into the stocks to which they are added. These films and bags only totally disperse in internal mixers such as Banburys, but do not homogeneously disperse into the mixed stock when using a mill. This disadvantage is operational regardless of whether the contents are powders or predispersed chemical dispersions.

By the present invention, there is provided a unitary packaging system comprising predispersed chemicals in preweighed amounts in multiple components of a masterbatch. By using the packaging system on a mill or in a Banbury, one can obtain a homogeneous dispersion of the preweighed chemicals, active ingredients and the masterbatch material of the packaging system (wrapper) at a desirable mixing temperature.

SUMMARY OF THE INVENTION

In accordance with the foregoing, the present invention encompasses a unitary packaging system comprising predispersed chemicals in preweighed quantities in multiple, separated compartments of a masterbatch. Also encompassed by the invention is a method of packaging rubber chemicals for storage and delivery to blending equipment comprising providing predispersions of the chemicals; incorporating the chemicals into a masterbatch to provide a homogeneous mixture. Further encompassed by the invention is a process for reducing chemical behavior or eutectic behavior of chemicals by packaging the chemicals as predispersed chemicals in preweighed quantities in multiple separated compartments of a masterbatch.

By the term "predispersed" is meant the complete and homogeneous distribution of a powdered chemical within a polymeric matrix containing optionally plasticizers, processing promoters and antioxidants. By the term "masterbatch" is meant a polymer containing a combination of a filler, plasticizer and optionally processing promoters, zinc oxide, antioxidants and others.

DETAILED DESCRIPTION OF THE INVENTION

The unitary packaging system of this invention can be described as an envelope of masterbatch material having sealed therein compartments of chemicals that are separated from one another. The masterbatch material of the packaging system (packaging masterbatch) is of a composition that is compatible with the composition of the "base masterbatch" to which the packaging system is added. Preferably, the masterbatch material is of a composition that is the same as the composition of the "base masterbatch". The materials of the respective masterbatch can be made of polymers and a combination of fillers, plasticizers, processing promoters, antioxidants, tackifiers, zinc oxide and others.

The polymers can be selected from the group consisting of natural rubber, synthetic rubber, thermoplastic elastomers and mixtures thereof. The synthetic elastomers are exemplified by EPDM (ethylene-propylene diene monomer rubber), EPM (ethylene-propylene monomer rubber), EVA (ethylene-vinylacetate rubber), CPE (chlorinated polyethylene rubber), IIR (polyisobutylene), IR (polyisoprene), SBR (styrene-butadiene rubber), NBR (acrylonitrile-butadiene rubber), CM (chlorosulfonated polyethylene rubber), CR (polychlorprene rubber), etc.

The packaging system should be such that it can be conveniently handled under processing conditions. More specifically, the packaging system should be such that it can be conveniently lifted and placed in blending equipment. In the present embodiment, the packaging system can be of the following specifications. The envelope of the packaging system is about 18×72 inches and preferably about 12×40 inches. The thickness of the packaging system can be about 1 to 12 inches and preferably about 1 to 4 inches. Its weight can be fro abut 1 to 50 pounds and preferably about 1 to 10 pounds. In a presently preferred embodiment, the packaging system, aptly referred to as the "burrito", can be readily handled by, say, rolling it and conveniently placing it on a mill mixer.

In preparing the packaging system, one can employ molding or other fabricating means to form compartments that can be filled and sealed into a unitary packaging system. Typically, a bottom piece of the packaging system having separate compartments is formed, filled with the chemicals and then sealed with a top piece to provide a unitary packaging system. The bottom piece has at least one sealable opening that can be used to receive the predispersed chemicals. After filling the compartments of the bottom piece, it is sealed with a top piece. The following is a description of the predispersed chemicals that are filled into the compartments.

The predispersed chemicals are rubber chemicals that are used in compounding the base masterbatch. Typically, these chemicals are used for the purpose of vulcanizing, regulating the rate of vulcanization, facilitating the fabrication of the end-product and improving the stability or quality of the end-product. The rubber chemicals can be predispersed by using techniques known to the art. Illustrative examples of the rubber chemicals include vulcanizing agents, accelerators of vulcanization, activators, retarders, blowing agents and antioxidants and antiozonants. The vulcanizing agents are those chemicals used to form crosslinks between adjacent polymer molecules and consist commonly of sulfur (rhombic and amorphous); organic peroxides, such as dicumyl peroxide; sulfur donors, such as DTDM (4,4'-dithiomorpholine); and alkylated phenol-formaldehyde curing resins such as alkylphenol-formaldehyde resin and bromomethylated alkylphenol-formaldehyde resin. The accelerators for vulcanization used for the vulcanization of organic polymers are selected from sulfur containing organic vulcanization accelerators and nitrogen containing organic vulcanization accelerators. The sulfur containing organic accelerators can be selected from the group consisting of thiazoles, thiazyl sulfides, sulfenamides, thiurams, dithiocarbamates, dithiophosphates and thioureas. Specific examples of the sulfur containing accelerators can be selected from the group 2-mercaptobenzothiazole (MBT); and the zinc salts thereof; benzothiazyl disulfide (MBTS); N-cyclohexyl-2-benzothiazyl sulfenamide (CBS); tetramethyl thiuram disulfide (TMTD); zinc dimethyl dithiocarbamate (ZDMC), zinc diethyl dithiocarbamate (ZDEC), zinc butyl dithiocarbamate (ZDBC) and tellurium diethyldithiocarbamate (TDEC); zinc dialkyl dithiophosphate, zinc-amine dithiophosphate complex, copper dialkyl dithiophosphate, amine salt of dialkyl dithiophosphate, and zinc dialkyl thiophosphate polysulfide; and ethylene thiourea (ETU). The nitrogen containing organic accelerators can be selected from the group consisting of aldehyde-amine condensation products, amines, guanidines, ureas and other miscellaneous nitrogen compounds. Specific examples of the nitrogen containing accelerators can be selected from the group N,N'-dicinnamylidene-1,6-hexanediamine, hexamethylene tetramine, diphenyl guanidine (DPG), di-ortho-tolylguanidine (DOTG), urea and its derivatives, and others.

As the activators, one can employ a member selected from the group consisting of zinc oxide, magnesium oxide, lead oxides, amines (secondary accelerators) barium carbonate, and others.

As the retarding agent (a chemical having a retarding effect on the vulcanization of organic polymers) one can employ nitrogen or oxygen scorch retarders. Illustrative but non-limiting examples of these retarders can be selected from the group consisting of benzoic acid, salicyclic acid, phthalic anhydride, N-cyclohexyl thiophthalimide, N-isopropylthio-N-cyclohexyl-2-benzothiazyl sulfenamide, and others.

As antioxidants, one can employ organic compounds selected from the group consisting of organic amine compounds, organic phenol compounds, organic hydroquinone compounds and organic thiophenol compounds. Specific examples of these compounds can be selected fro the group consisting of phenyl-p-naphthylamine and derivatives thereof, the substituted phenols and bisphenols including 4,4'-bis(2,6-di-t-butylphenol), 4,4'-methylene-bis(2,6-butyl-o-cresol) and 3,2'-dimethylene-bis(4-methyl-6-t-butyl phenol). Other antioxidants useful herein can be selected from the group consisting of 2,2'-methylene-bis-(4-methyl-6-tert-butylphenol) (BPH), N-isopropyl-N'-phenyl-p-phenylenediamine (IPPD), 2-mercapto-benzimidazole (MBI), 2-mercapto-4(5) methyl-benzimidazole (MMBI-MTI), nickel dibutyldithiocarbamate (NBC); stearically hindered bisphenols, polycarbonamides, phenyl-beta-naphthylamines, zinc salts of 4 & 5-methyl mercaptobenzimidazoles, zinc-2-mercaptotoluimidazole (ZMTI) and other.

Other chemicals that are useful herein can be antiozonants, blowing agents, blowing agent activators, dessicants, processing promoters and the like. As the antiozonants, one can employ a member selected from the group consisting of unsaturated aromatic ethers and others. As the blowing agents one can employ an azodicarbonamide, p,p'-oxybis(benzenesulfonylhydrazide), and others. As the blowing agent activator one can employ an amine selected from the group consisting of urea, derivatives of urea, hexamethylene tetramine, diphenyl guanidine, and di-o-ditolylguanidine; and other alkaline materials such as metal oxides. As a metal oxide (desiccants) one can employ calcium oxide. As a processing promoter one can employ a member selected from the group consisting of zinc and calcium salts of naturally occurring fatty acids, fatty acid esters, fatty alcohols, N,N'-bis-stearoyl ethylene diamide, pentaerythrityl tetrastearate, carnuba wax, paraffin waxes, alkylated naphthenic/aromatic resins, alkylated naphthalene formaldehyde resins, blends of the above and others.

The following is an illustrative, but non-limiting description of a method of preparing the packaging system containing the chemicals. A sheet of masterbatch material is placed over a mold having formed therein compartments of the size and shape desired in the packaging system and then made to conform to the design of the mold. This molded section of the masterbatch is alternately described herein as the bottom piece of the packaging system. The compartments of the bottom piece can be filled by using a filling means that can be manual, mechanical, electronic, or the like and a combination thereof. Generally, the compartments can be filled from a position that is overhead of the compartment, using an electronic scale that constantly delivers a predetermined amount of each ingredient into its proper compartment. The preweighed quantities of the pre-dispersed chemicals are in amounts sufficient to cure the appropriate masterbatch so as to attain the desired physical properties of the final cured article. More than one packaging system per batch of masterbatch may be required to cure the masterbatch. The volume of the compartment and the volume of ingredients are such that the ingredients just fill the compartment.

The following is an illustrative, but non-limiting description of the method of filling the compartments. The compartments can be filled by using a filling machine comprising: a feed hopper means disposed to receive a supply of bulk predispersed chemicals and to selectively disperse the predispersed chemicals into accumulator vessels wherein the weight of the chemicals to be incorporated into the compartment of the masterbatch is determined. The weight is determined by a weighing means which is operatively connected to the accumulator vessel for determining the weight. A weighing means such as a beam scale type that is operatively connected to the accumulator vessel for sensing the weight of materials accumulated therein and is also operatively connected to the hopper means to regulate the flow of material therefrom in accordance with the sensed weight of materials within the vessel. Whenever the weight of the materials reaches a predetermined value corresponding to the weight of materials to be incorporated within the compartment of the masterbatch, the weighing means causes interruption of the flow of materials from the hopper means. The weight means can be further operatively connected to the accumulator vessel bottom outlet closure means for operating said closure means to open the outlet for emptying the vessel whenever the weight of the materials accumulated therein reaches the predetermined compartment fill value, and of course after the flow of materials from the hopper means has been interrupted. A conduit means can be generally disposed in an underlying relation to the bottom outlet of the accumulator vessel to receive materials discharged therefrom and serve to guide the flow of such materials into a compartment of the masterbatch. The conduit means can contain a conduit member having a funnel portion for capturing the downwardly flowing materials, a spout portion dispersed for insertion or discharge into the compartment of the masterbatch.

The control of materials flowing from the bottom outlet of the supply hopper means is accomplished by means of a valve closure member having an actuating means for controlling the closing and opening positions of the valve.

After the compartments had been filled, another sheet masterbatch is pulled across the top of the compartments (top piece) and is then sealed to the bottom piece of the compartment. Sealing can be done by contacting the material of the bottom piece with the material of the top piece. More specifically, the top piece can be pressed onto the bottom piece of the compartment to provide a seal that is sufficient to keep the chemicals of the different compartments separated. Also the seal should be sufficient to prevent leakage of the chemicals. One means of effectively sealing the packaging system comprises providing the bottom and top pieces that have sufficient tack to seal when they are pressed together. Typically, the pieces have sufficient green strength to retain their structural integrity and remain sealed. It would be within the purview of the skilled artisan to provide masterbatches of compositions that provide the requisite tack and green strength. The resulting seal packaging system can be described as an embedded masterbatch material having sealed therein compartments of chemicals that are separated from one another.

The packaging system of the invention can be used in a compounding process. The temperature of the compounding process can vary considerably, but seldom exceeds, about 150° to 175° C. It is a distinct feature of the invention that one can provide for the delivery of preweighed compartmentalized predispersed chemicals in a wrap of masterbatch that can be rapidly and homogeneously mixed into a base masterbatch on a mill even at room temperature without having chemicals falling into pans or going up the exhaust of the dust collecting system. It is also a distinct feature of the invention that mixing times of each batch can be drastically reduced to only about 25% of the time needed to mix the same ingredients in powdered form. Since mixing is done quickly, the heat history of the mix is much better than that of prior art processes. There is, therefore, provided longer scorch times and improved processibility of the base masterbatch.

In the practice of the invention, the packaging system can be used as follows. A Banbury batch of (base) masterbatch is dropped onto a mixing mill. Depending on the weight of the base masterbatch, and thus the required weight of curatives, the mill operator might add one, two or three packaging systems into the mill. As would be realized the present invention provides a facile and effective means of mixing rubber chemicals. As would also be realized, the present invention provides a process for reducing chemical reaction or eutectic behavior of chemicals by packaging the chemicals as predispersed chemicals in preweighed quantities in multiple separated compartments of a masterbatch.

The invention is further illustrated by the following non-limiting examples.

EXAMPLES

Example 1

This example illustrates a packaging system having five different ingredients in seven compartments of a masterbatch. The masterbatch used herein was made of EPDM and weighed 1.70 pounds. The ingredients and their parts by weight used herein are listed below. The ingredients were incorporated into the packaging system in the manner described herein.

| Ingredients | Parts by Weight (gm) | Compartment # |
| --- | --- | --- |
| Rhenogran TMTD-75 (RD1016)[1] | 120 | 1 |
| Rhenogran MBTS-75 (RD1021)[2] | 220 | 1 |
| Rhenogran S-80 (RD1010)[3] | 800 | 2 |
| Rhenogran TBBS-75 (RD1017)[4] | 600 | 2 |
| Rhenogran ZDMC-80 (RD1020)[5] | 80 | 1 |

[1]EPM/EVA Binder; 75% activity of tetramethyl thiuram disulfide
[2]EPDM/EVA Binder; 75% activity of benzbthiazyl disulfide
[3]EPDM/EVA Binder; 80% activity of rubber grade sulfur
[4]EPM/EVA Binder; 75% activity of n-tert-butyl-2-benzothiazole sulfenamide
[5]EPDM/EVA Binder; 80% activity of zinc dimethyldithiocarbamate

Example 2

This example illustrates a packaging system having four different ingredients in seven compartments of a masterbatch. The masterbatch used herein was made of EPDM and weighed 2.4 pounds. The ingredients and their parts by weight are listed below. The ingredients were incorporated into the packaging system in the manner described herein.

| Ingredients | Parts by Weight (gm) | Compartment # |
| --- | --- | --- |
| Rhenogran TMTD-75 (RD1016) | 170 | 1 |
| Rhenogran MBTS-75 (RD1021) | 310 | 1 |
| Rhenogran S-80 (RD1010) | 1125 | 3 |
| Rhenogran TBBS-75 (RD1017) | 850 | 2 |

Example 3

This example illustrates a packaging system having six different ingredients in seven compartments of a masterbatch. The masterbatch used herein was made of EPDM and weighed 2.2 pounds. The ingredients and their parts by weight used herein are listed below. The ingredients were incorporated into the packaging system in the manner described herein.

| Ingredients | Parts by Weight | Compartment # |
|---|---|---|
| Rhenogran CBS-75 (RD1029)[1] | 430 | 1 |
| Rhenogran ZDBC-75 (RD1012)[2] | 650 | 2 |
| Rhenogran TMTD-75 (RD1016) | 300 | 1 |
| Rhenogran DPTT-70 (RD1014)[3] | 290 | 1 |
| Rhenogran TDEC-75 (RD1015)[4] | 65 | 1 |
| Rhenogran S-80 (RD1010) | 110 | 1 |

[1]EPDM/EVA Binder, 75% activity of N-cyclohexyl-2-benzothiazyl sulphenamide
[2]EPDM/EVA Binder, 75% activity of zinc dibutyldithiocarbamate
[3]EPDM/EVA Binder, 75% activity of dipentamethylene thiuram hexasulfide/tetrasulfide
[4]EPDM/EVA Binder, 75% activity of tellurium diethyldithiocarbamate Example 4

This example illustrates a packaging system having six different ingredients in six compartments of a masterbatch. The masterbatch used herein was made of EPDM and weighed 1 pound. The ingredients and their parts by weight used herein are listed below. The ingredients were incorporated into the packaging system in the manner described herein.

| Ingredients | Parts by Weight | Compartment # |
|---|---|---|
| Rhenogran S-80 (RD1010) | 250 | 1 |
| Rhenogran DPG-80[1] | 180 | 1 |
| Rhenogran ZDBC-75 (RD1012) | 190 | 1 |
| Rhenogran DPTT-70 (RD1014) | 210 | 1 |
| Rhenogran MBTS-75 (RD1021) | 240 | 1 |
| Rhenosorb C/CW[2] | 225 | 1 |

[1]EPDM/EVA Binder, 80% activity of diphenylguanidine
[2]EPDM/EVA Binder, 80% activity of calcium oxide Example 5

This example illustrates a packaging system having seven different ingredients in seven compartments of a masterbatch. The masterbatch used herein was made of EPDM and weighed 2.1 pounds. The ingredients and their parts by weight used herein are listed below. The ingredients were incorporated into the packaging system in the manner described herein.

| Ingredients | Parts by Weight | Compartment # |
|---|---|---|
| Rhenogran S-80 (RD1010) | 550 | 1 |
| Rhenogran MBT-75 (RD1011)[1] | 385 | 1 |
| Rhenogran DPTT-70 (RD1014) | 390 | 1 |
| Rhenogran MBTS-75 (RD1021) | 220 | 1 |
| Rhenogran ETU-75 (RD1013)[2] | 230 | 1 |
| Rhenogran TDEC-75 (RD1015) | 60 | 1 |
| Rhenogran ZDBC-75 (RD1012) | 480 | 1 |

[1]EPDM/EVA Binder, 75% activity of 2-mercaptobenzothiazole
[2]EPDM/EVA Binder, 75% activity of ethylene thiourea Example 6

This example illustrates a packaging system having five different ingredients in five compartments of a masterbatch. The masterbatch used herein was made of EPDM and weighed 0.4 pounds. The ingredients and their parts by weight used herein are listed below. The ingredients were incorporated into the packaging system in the manner described herein.

| Ingredients | Parts by Weight | Compartment # |
|---|---|---|
| Rhenogran MBTS-75 (RD1021) | 150 | 1 |
| Rhenogran DPG-80 | 80 | 1 |
| Rhenogran S-80 (RD1010) | 590 | 1 |
| Rhenogran TMTD-75 (RD1016) | 70 | 1 |
| Rhenoslab AZ130-75[1] | 850 | 1 |

[1]EPDM/EVA Binder, 75% activity of azodicarbonamide

Example 7

This example illustrates the use of the packaging system and evaluation of the performance properties of the packaging system of the present invention, and presents a comparison thereof with packaging systems containing preweighed powders. Under actual factory mill-mixing conditions, the preweighed package of chemicals in a masterbatch wrapping described in Example 4 was mill mixed to a complete and homogeneous state in just under two minutes. In comparison, the same ingredients in powdered form mixed on the same mill into the same masterbatch took 12 minutes to achieve the same degree of homogeneity.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A unitary package comprising at least one masterbatch material selected from the group consisting of natural rubber, synthetic rubber, thermoplastic elastomers and mixtures thereof, said package being formed to contain a plurality of separate compartments, wherein each said compartment comprises at least one preweighed quantity of a polymer matrix having one or more chemicals dispersed therein.

2. The package of claim 1 wherein the chemicals dispersed in the polymer are members selected from the groups consisting of vulcanizing agents (curatives), accelerators, activators and retarders, blowing agents, blowing agent activators, metal oxides (desiccants), antioxidants, antiozonants and processing promoters.

3. The package of claim 1 wherein the preweighed quantities of the polymer matrix are in amounts sufficient to cure the appropriate base masterbatch.

4. A process for compounding rubber comprising mixing a unitary package comprising at least one polymer matrix having a chemical dispersed therein in preweighed quantities in multiple separated compartments within a masterbatch material selected from the group consisting of natural rubber, synthetic rubber, thermoplastic elastomers and mixtures thereof of said package.

5. A method of packing rubber chemicals for storage and delivery comprising providing at least one polymer matrix having a chemical dispersed therein, forming a plurality of separate compartments from at least one masterbatch material selected from the group consisting of natural rubber, synthetic rubber, thermoplastic elastomers and mixtures thereof, incorporating preweighed quantities of the at least one polymer matrix in said plurality of compartments and sealing said plurality of separate compartments to provide a unitary package having said plurality of separated compartments.

6. A process for reducing eutectic behavior of chemicals by packaging said chemicals as a polymer matrix in preweighed quantities in a plurality of separate compartments formed from at least one masterbatch package from a material selected from the group consisting of natural rubber, synthetic rubber, thermoplastic elastomers and mixtures thereof.

7. A process for reducing chemical reaction behavior of chemicals by packaging said chemicals as a polymer matrix in preweighed quantities in a plurality of separate compartments of a package formed from at least one masterbatch material selected from the group consisting of natural rubber, synthetic rubber, thermoplastic elastomers and mixtures thereof.

* * * * *